(12) United States Patent
Knopp et al.

(10) Patent No.: US 6,705,201 B2
(45) Date of Patent: Mar. 16, 2004

(54) ACTIVATION DEVICE FOR A PISTON/CYLINDER UNIT

(75) Inventors: Axel Knopp, Eitelborn (DE); Stephan Enders, Koblenz (DE); Manfred Metzdorf, Koblenz (DE)

(73) Assignee: Stabilus GmbH, Koblenz (DE)

( * ) Notice: Subject to any disclaimer, the term of this patent is extended or adjusted under 35 U.S.C. 154(b) by 0 days.

(21) Appl. No.: 10/233,914

(22) Filed: Sep. 3, 2002

(65) Prior Publication Data

US 2003/0062662 A1 Apr. 3, 2003

(30) Foreign Application Priority Data

Sep. 3, 2001 (DE) .......................................... 101 42 883

(51) Int. Cl.[7] .............................................. F15B 11/08
(52) U.S. Cl. ........................................ 91/437; 267/124
(58) Field of Search ................... 91/437, 438; 267/117, 267/124; 297/301.2, 301.5

(56) References Cited

U.S. PATENT DOCUMENTS 4,830,432 A    5/1989   Fuhrmann et al. .......... 297/304
5,915,674 A  * 6/1999   Wolf et al. ................. 267/124

FOREIGN PATENT DOCUMENTS

| DE | 33 30 815 A1 | 3/1985 | .............. F16F/9/19 |
| DE | 36 15 688 A1 | 11/1987 | .............. A47C/3/30 |
| DE | G 92 12 735.5 | 2/1994 | |
| GB | 2 252 904 | 8/1992 | .............. A47C/3/30 |
| GB | 2 304 036 A | 3/1997 | .............. A47C/1/024 |
| GB | 2 304 036 | 3/1997 | .............. A47C/1/024 |

* cited by examiner

Primary Examiner—Edward K. Look
Assistant Examiner—Michael Leslie
(74) Attorney, Agent, or Firm—Cohen, Pontani, Lieberman & Pavane

(57) ABSTRACT

A piston/cylinder unit, in particular a gas spring, includes a valve device for the operational motion of a piston rod. The valve device is activatable by an activation device, the activation device being connected near an actuation device and being connected to a load contact device, which influences the function of the valve device. The load contact device connects the actuation device to the valve device for the purpose of changing the adjustability of the valve device when the gas spring is loaded.

14 Claims, 3 Drawing Sheets

ACTIVATION DEVICE FOR A PISTON/CYLINDER UNIT

BACKGROUND OF THE INVENTION

1. Field of the Invention

The present invention relates to an activation device for a piston/cylinder unit, in particular for a gas spring, whose movement can be selectively inhibited and includes a valve device for operational motion of a piston rod and an activation device for operating the valve device.

2. Description of the Prior Art

Gas springs whose movement can be selectively inhibited are employed, for example, in chairs which have a seat back which is spring-supported and can be rigidly held by the selective inhibiting function of the gas spring. A chair user does not, however, continuously adopt the same posture on the chair. The seat back position can be very easily matched to the instantaneous seating position by the activation device. The user may also, for example, lean forward so that the seat back has no contact with the back of the user. If the activation device for the gas spring on the seat back is actuated while the user is in this position, the seat back is accelerated by the gas spring in the direction of the user's back and impinges on it. This operational behavior is undesirable. German reference DE 69 35 911 U1 describes a gas spring which has a divided activation push-rod, a spring being arranged between the two activation push-rod sections. Slower opening of the blocking valve within the gas spring is achieved using the spring.

A similar activation means is described in German reference DE 36 15 688 A1 in which a valve cross section of the blocking valve changes over the stroke path of the activation push-rod. The throttling associated with this valve only permits the piston rod to extend slowly at the beginning of the stroke path of the activation push-rod and then increasingly more rapidly toward the end of the activation push-rod stroke length. Although the problem of undesireable contact with the seat back is diminished by both of these prior art types of gas springs, it is by no means reliably prevented.

GB 2 304 036 A1 (GB '036) relates to an activation device which has two switching inputs. The activation push-rod can, on the one hand, be activated by means of a Bowden cable. In addition, the seat support is in connection with the activation device such that when the seat support is unloaded, the gas spring is always in the unlocked operating function is always adopted on the gas spring independently of the switching condition of the Bowden cable. An activation appliance, which acts directly on the activation push-rod and which is embodied as a rocker arm is used for activating the Bowden cable. An essential feature is that the seat panel is required to pivot for recording the loading condition. However, this imposes a limitation to the chair design. Comfortable chairs often feature a seat inclination adjustment. Such a seat inclination adjustment would have a substantial influence on the function of the activation device of GB '036.

SUMMARY OF THE INVENTION

The object of the present invention is to provide a piston/cylinder unit, in particular a gas spring, having a braked operating motion independent of stroke.

According to the present invention, the object is achieved by a loaded gas spring having a load contact device connecting an actuation device to the valve device of the gas spring piston for the purpose of changing the adjustability of the valve device. When using a chair, the load contact device is associated with the advantage—for the user of the chair—that when the seat back is not in contact with his back, the inhibited movement position of the gas spring cannot be canceled by a switching movement on the actuation device. If, however, the seat back is in contact with the user's back, then the load contact device permits a comfortable seat back adjustment using the actuation device. The seat back does not strike the user because it is already in contact with his back.

The load contact device may include a slide which can move relative to the gas spring. The slide is in effective connection with the actuation device at a fixed location. When the seat back is loaded by the user, the slide moves the actuation device into a position from which an effective actuation motion can take place.

To continually ensure a defined operating position of the load contact device, the slide is preloaded by a spring in the direction of a disengaged position of the load contact device.

It should, as far as possible, be possible to combine the load contact device according to the invention with a standard gas spring. For this purpose, an activation push-rod for the valve device is divided in two parts in the axial direction. A first part of the activation push-rod is contained in the gas spring as a series production item. A second part, which has the approximate axial length of the load contact device, can then be used as an adapter.

To obtain increased design freedom in the choice of the spring for the load contact device, the load contact device has a spring support, which is firmly connected axially to the gas spring. As an alternative, the spring may also be arranged to engage on an end surface of the gas spring.

The spring support may thus be formed by a threaded sleeve. The threaded sleeve permits adaptation of the position of the load contact device to compensate for possible manufacturing tolerances.

To ensure that the gas spring has a reliable fastening to the load contact device, an axial stop may be used to limit the displacement path of the load contact device. In this arrangement, the axial stop contacts the spring support.

The slide, an end of the slide for supporting the spring urgency and the axial stop for receiving the other end of the spring form a casing of the load contact device, in which the spring is enclosed. This allows the load contact device to be manufactured as a structural unit independently of the technical application and the gas spring can be manufactured as a separate sub-assembly.

In addition, the end of the slide forms a further axial stop acting in a direction opposite to that of the first axial stop, so that the operational movement of the slide is limited in both directions and the spring is not necessarily preloaded to provide the blocking function.

In a particularly simple embodiment, the spring is supported on the cylinder. The major advantages of this solution is that it is possible to dispense with a separate casing. Furthermore, the use of the load contact device according to this embodiment requires practically no loss of the stroke of the conventional piston/cylinder unit.

The spring support may be fastened to the cylinder, the spring being supported on the unit composed of the slide and the activation device.

Furthermore, the slide may be supported on the piston rod. The piston rod features a very high-quality surface so that good guidance is provided. It is, furthermore, possible to dispense with a fastening thread for the load contact device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PREFERRED EMBODIMENTS

Figure 1:
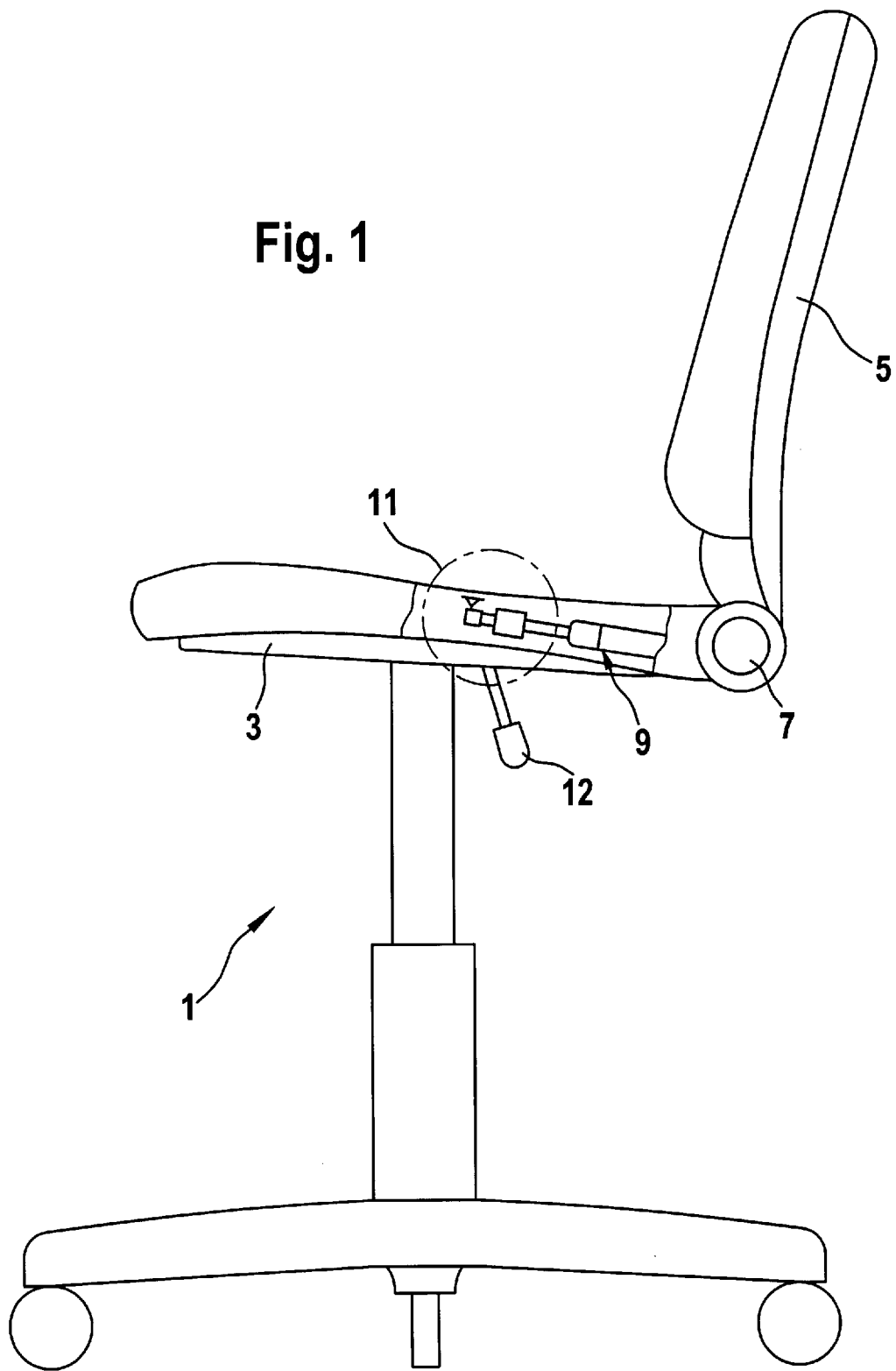
FIG. 1 is a partial cutaway side view of a chair including a piston/cylinder unit according to an embodiment of the present invention.

FIG. 1 shows a chair 1 having a seat carrier 3 and a seat back 5 supported on the sear carrier 3 so that the seat back 5 is pivotable about a bearing 7. A piston/cylinder unit 9 designed as a gas spring is functionally arranged between the seat back 5 and the seat carrier 3. By means of an activation device 11 including an actuating lever 12, the gas spring 9 may be switched into an inhibited movement position or an enabled movement position.

Figure 2:
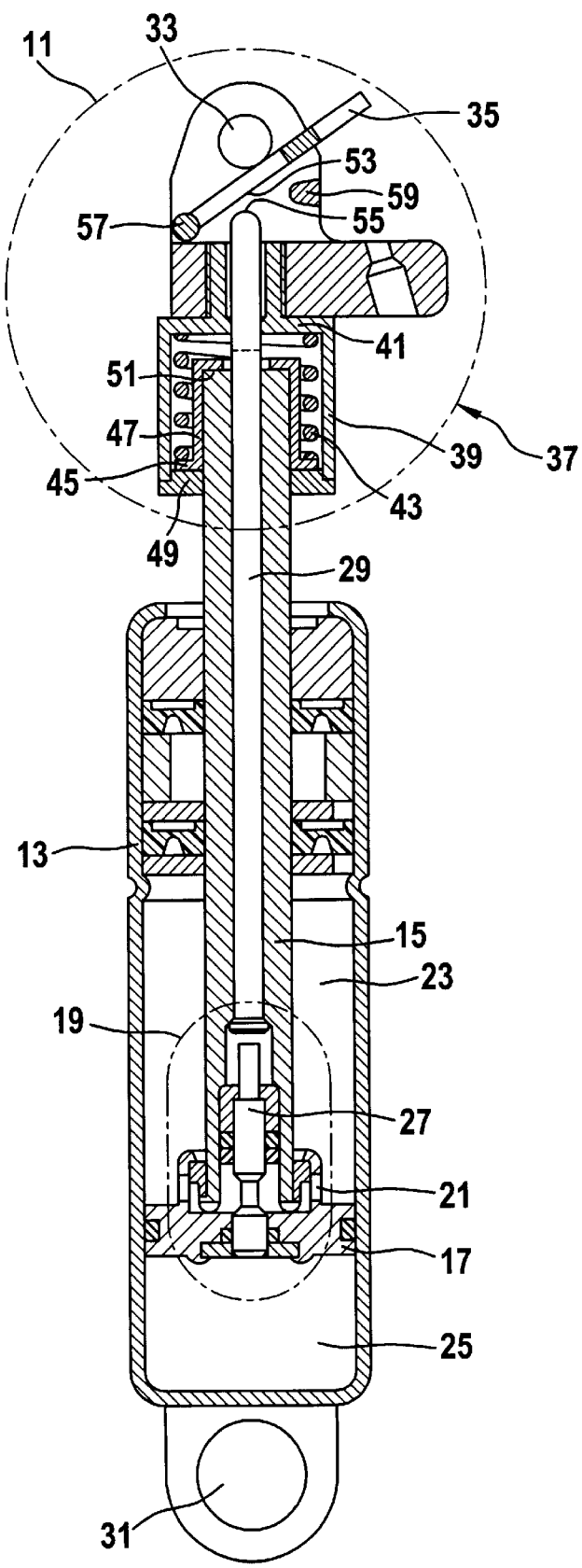
FIG. 2 is a sectional view of a gas spring with a load contact device as a sub-assembly of the piston/cylinder unit from FIG. 1.

FIG. 2 shows, on an enlarged scale, the gas spring 9 with the activation device 11 as a sub-assembly. A piston rod 15 is arranged so that it can be moved axially within a cylinder 13 filled with a pressurized gas. A separating piston 17 which includes a valve device 19, is arranged at the end of the piston rod 15 located within the cylinder. The valve device 19 influences a flow connection 21 between working spaces 23, 25 of the cylinder which are separated by the piston. A valve push-rod 27 of the valve device 19 is actuatable by an activation push-rod 29 within the hollow piston rod 15 by the outer end of the piston rod.

When the valve device 19 is in the inhibited position, the flow connection 21 is closed and the piston rod motion is blocked in both axial directions whereas, when the flow connection 21 is open, a pressure force in the extension direction acts on the piston rod 15.

The cylinder 13 and the activation device 11 each have a connection element 31, 33 for fastening the gas spring between the seat back 5 and the seat support 3.

The activation device 11 arranged on the piston rod 15 also includes a load contact device 37. The load contact device has a slide 39 which is axially moveable relative to the piston rod 15. A spring 43 is supported on a spring support 45 and preloads the slide 39 via an end 41 of the slide. The spring support 45 is part of a threaded sleeve 47 which is fastened to the piston rod 15. An axial stop 49 engages behind the spring support 45 so that the maximum displacement movement of the slide 39 is determined by the maximum possible distance between the end 41 and an end surface 51 of the piston rod 15. The slide 39 including the end 41 and the axial stop 49 form a casing in which the spring 43 is enclosed, the casing representing a sub-assembly which can be manufactured independently of the gas spring 9.

FIG. 2 shows the gas spring 9 in the unloaded position in which there is, because of the spring force of the spring 43, a distance between a pressure surface 53 of the actuation device 35 and an end surface 53 of the activation push-rod 29. The distance between the two parts is greater than or equal to the maximum distance between the end 41 and the end surface 51 of the piston rod 15. The load contact device 37 is in a disengaged position. A pivot bearing 57 of the actuation device 35 is arranged to have a fixed axial location relative to the load contact device 37, namely the end 41 and the slide 39, so that the actuation device 35 moves with the load contact device during a displacement movement of the load contact device 37. If the actuation device 35 is moved in the direction of the activation push-rod 29, a contact with the activation push-rod 29 may be produced in any event. However, a further actuation movement of the actuation device 35 is prevented by a stop 59 (only represented in principle) in the unloaded position of the load contact device. As a result, the valve device 19 within the gas spring 9 cannot be switched over when the gas spring is unloaded.

When the gas spring is loaded such as, for example, when a person leans on the seat back, the connection element 33, together with the load contact device 37 and the actuation device 35, is displaced in the direction of the activation push-rod 29. This displacement causes the end 41 of the slide 39 in the load contact device 37 to contact the end surface 51 of the piston rod 15. The spring 43 does not, in any case, have to support the load on the seat back 5. Rather is is only required to produce a disengagement force to again disengage the load contact device upon unloading of the gas spring. If the actuation device 35 is activated while the gas spring is loaded, a small idle path, which compensates for manufacturing tolerances, can under certain circumstances be overcome but, otherwise, the valve device 27 is moved into a disengagement setting by means of the actuation device 35 and the activation push-rod 19 in contact with it. The associated extension force on the piston rod 15 does not cause any impact by the seat back on the person because contact is already present.

The load contact device 37 does not necessarily have to be arranged on the piston rod 15 but may also act on the cylinder 13 if, for example, the valve device 27 is embodied in the region of the cylinder-end connection element 31.

The activation push-rod 29 may also comprise two parts, as is indicated by the dashed line in FIG. 2. A standard gas spring may be used without modification with a further length section of the activation push-rod used with the load contact device.

Figure 3:
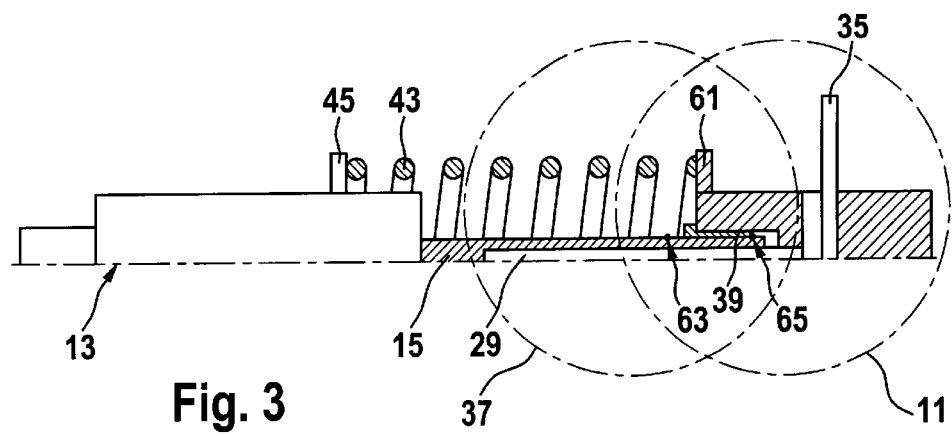
FIG. 3 is a sectional view of a load contact device and activation device of a gas spring according to another embodiment of the present invention.
Figure 4:
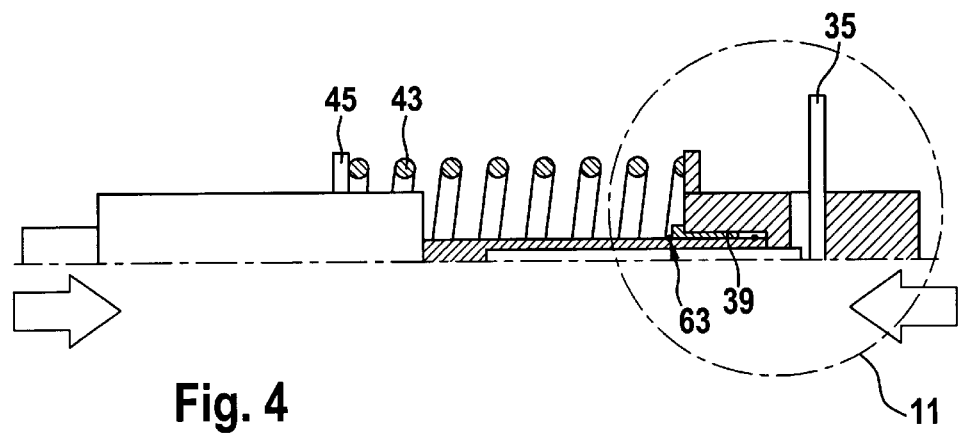
FIG. 4 is a sectional view of the load contact device and activation device of a gas spring of FIG. 3 in the loaded position.
Figure 5:
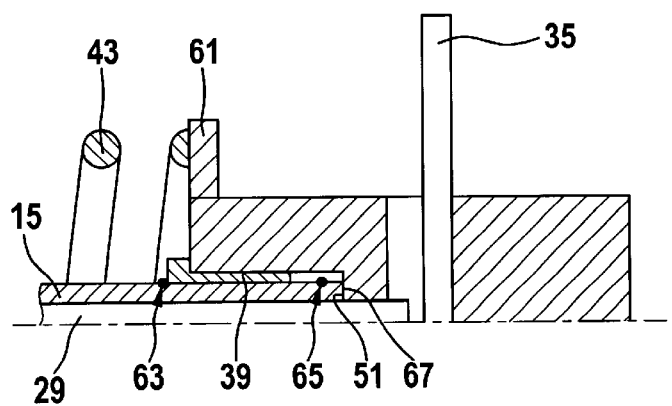
FIG. 5 is a detailed sectional view of the activation device of FIG. 4.

FIGS. 3–5 depict a further embodiment of the invention in which the slide 39 of the load contact device 37, see FIG. 5, is almost completely arranged within the activation device 11 and is directly supported on the piston rod 15. One end of the spring 43 is supported on a spring plate 61 arranged on the activation device and the other end of spring 43 is supported on the spring support 45 arranged on the cylinder 13. Two axial stops 63, 65 are fastened as securing rings on the piston rod 15 to limit the displacement path of the slide 39. The end 67 of the activation device 11 may be supported on the end surface 51 of the piston rod, which may also provide the axial stop.

During assembly, the slide 39 is fed onto the piston rod 15. The axial stop 65 is then assembled on the piston rod. In the next step, the slide 39 is pushed as far as the axial stop 65 and the other axial stop 63 is fastened to the piston rod. Finally, the activation device 11 is pushed onto the slide 39. A press connection or threaded connection may be used to effect the connection between the activation device and the slide.

In FIG. 3, the piston/cylinder unit is shown unloaded so that the spring 43 preloads the activation device 11, together with the slide 39, onto the axial stop 65. In this position, the actuation device 35 is displaced so far firm the activation push-rod 29 that the actuation device can not be activated in this position.

FIG. 4 includes force arrows symbolizing a pressure loading on the piston/cylinder unit when, for example, a person loads the seat back 5, see FIG. 1. The external forces displace the activation device 11, together with the slide 39, against the force of the spring 43 until the activation device comes into contact, by means of the slide, with the axial stop 63. In this operating position of the activation device 11, the activation push-rod 29 can be activated by the actuation device 35 to enable movement of the gas spring.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A gas spring piston/cylinder unit, comprising:
   a piston cylinder assembly comprising a cylinder, a piston rod, and a piston arranged at one end of said piston rod, said piston dividing said cylinder into two working spaces and being axially movably arranged in said cylinder;
   a valve device operatively arranged between said two working spaces of said cylinder for selectively inhibiting operational motion of said piston rod in said cylinder;
   an activation device operatively connected for operating said valve device;
   an actuation device arranged proximate said activation device; and
   a load contact device operatively connected for connecting said actuation device and said activation device for enabling the operation of said valve device by said actuation device when a load is applied to said gas spring piston/cylinder unit.

2. The piston/cylinder of claim 1, wherein said load contact device comprises a slide movably arranged relative to said gas spring piston/cylinder unit for moving between an engaged position and a disengaged position, said slide being in operative connection with the actuation device at a fixed location such that said actuation device moves with said slide.

3. The piston/cylinder unit of claim 2, further comprising a spring operatively arranged for urging said slide in the direction of the disengaged position of the load contact device.

4. The piston/cylinder unit of claim 1, wherein said activation device comprises a two-part activation push-rod for operating the valve device.

5. The piston/cylinder unit of claim 3, wherein the load contact device further comprises a spring support for said spring, said spring support being fixedly connected to said piston/cylinder assembly relative to an axial direction.

6. The piston/cylinder unit of claim 5, wherein said spring support comprises a threaded sleeve.

7. The piston/cylinder unit of claim 2, wherein said slide comprises an axial stop for limiting a displacement path of said load contact device.

8. The piston/cylinder unit of claim 5, wherein said slide comprises an axial stop for limiting a displacement path of said load contact device and wherein said axial stop contacts said spring support.

9. The piston/cylinder unit of claim 8, wherein said slide comprises an end for receiving a spring force of said spring, and wherein said slide, said end and said axial stop form a casing enclosing said spring.

10. The piston/cylinder unit of claim 9, wherein said end of said slide forms a second axial stop acting in a direction opposing said first axial stop, said first and second axial stops limiting movement of said slide in both axial directions.

11. The piston/cylinder unit of claim 3, wherein said spring is supported on said cylinder.

12. The piston/cylinder unit of claim 5, wherein said spring support is fastened to said cylinder.

13. The piston/cylinder unit of claim 3, wherein said activation device and said slide form a unit, said spring being supported on said unit.

14. The piston/cylinder unit of claim 3, wherein said slide is supported on said piston rod.

* * * * *